United States Patent
Swier, Jr. et al.

(10) Patent No.: US 7,257,107 B2
(45) Date of Patent: Aug. 14, 2007

(54) DEVICE AND METHOD FOR DETECTING UNAUTHORIZED, "ROGUE" WIRELESS LAN ACCESS POINTS

(75) Inventors: Richard M. Swier, Jr., Sarasota, FL (US); William R. Highsmith, Indialantic, FL (US); Edward C. Gerhardt, Malabar, FL (US)

(73) Assignee: Highwall Technologies, LLC, Sarasota, FL (US)

( * ) Notice: Subject to any disclaimer, the term of this patent is extended or adjusted under 35 U.S.C. 154(b) by 606 days.

(21) Appl. No.: 10/887,321

(22) Filed: Jul. 8, 2004

(65) Prior Publication Data

US 2005/0030929 A1    Feb. 10, 2005

Related U.S. Application Data

(60) Provisional application No. 60/487,539, filed on Jul. 15, 2003.

(51) Int. Cl.
*H04Q 7/00*   (2006.01)
*H04Q 7/24*   (2006.01)
*H04M 1/66*   (2006.01)
*H04M 1/00*   (2006.01)
*H04L 9/32*   (2006.01)

(52) U.S. Cl. ............... 370/338; 370/328; 455/410; 455/550.1; 455/556.2; 726/2

(58) Field of Classification Search ............... 370/395.52–395.53, 312–313, 310, 328, 370/338, 349, 410; 455/410–411, 422.1, 455/423–425, 426.2, 435.1, 457–458, 466, 455/41.2, 524

See application file for complete search history.

(56) References Cited

U.S. PATENT DOCUMENTS 5,977,913 A * 11/1999 Christ .................. 342/465

(Continued)

FOREIGN PATENT DOCUMENTS

WO    03/075021    9/2003

(Continued)

*Primary Examiner*—Meless Zewdu
(74) *Attorney, Agent, or Firm*—Allen, Dyer, Doppelt, Milbrath & Gilchrist, P.A.

(57) ABSTRACT

A system monitors and detects unauthorized wireless LAN access points and wireless devices. The system includes one or more wireless LAN monitoring devices, which detect and report the presence of unauthorized or "rogue" wireless LAN access points or wireless devices within a predetermined area, for example, within the vicinity of a wired LAN, including indoor and/or outdoor areas. Improved range is achieved through the use of preamplification and sectorized antennas. Larger areas may be covered using additional wireless LAN monitoring devices, which operate independently or cooperate together in the detection process. Geolocation is possible using single or multiple, cooperating monitoring devices. Provision can be made for monitoring devices to provide packet filtering on a wired LAN.

56 Claims, 4 Drawing Sheets

U.S. PATENT DOCUMENTS

| | | | |
|---|---|---|---|
| 6,754,488 B1* | 6/2004 | Won et al. | 455/424 |
| 7,002,943 B2* | 2/2006 | Bhagwat et al. | 370/338 |
| 7,130,289 B2* | 10/2006 | Kuan et al. | 370/338 |
| 7,154,874 B2* | 12/2006 | Bhagwat et al. | 370/338 |
| 2003/0117985 A1* | 6/2003 | Fujii et al. | 370/338 |
| 2003/0186679 A1* | 10/2003 | Challener et al. | 455/410 |
| 2003/0221006 A1* | 11/2003 | Kuan et al. | 709/225 |
| 2004/0003285 A1* | 1/2004 | Whelan et al. | 713/201 |
| 2004/0008652 A1* | 1/2004 | Tanzella et al. | 370/338 |

FOREIGN PATENT DOCUMENTS

| | | |
|---|---|---|
| WO | 03/079708 | 9/2003 |
| WO | 03/084255 | 10/2003 |
| WO | 03/085544 | 10/2003 |
| WO | 03/088547 | 10/2003 |
| WO | 03/088687 | 10/2003 |
| WO | 03/100559 | 12/2003 |

* cited by examiner

DEVICE AND METHOD FOR DETECTING UNAUTHORIZED, "ROGUE" WIRELESS LAN ACCESS POINTS

RELATED APPLICATION

This application is based upon prior filed copending provisional application Ser. No. 60/487,539 filed Jul. 15, 2003.

FIELD OF THE INVENTION

The present invention relates to the field of local area networks (LANs), and more particularly, the present invention relates to devices and methods used for detecting the existence of unauthorized access points and wireless devices, for example, within the general vicinity of a wired LAN.

BACKGROUND OF THE INVENTION

Organizations incorporate wireless local area networks (WLANs) to provide wireless access to a wired local area network (LAN) for desktop and laptop personal computers, personal digital assistants (PDAs), and other fixed or mobile computing devices. WLANs typically include wireless access points that provide wireless coverage over a defined area, according to the radio characteristics of the access point. They also provide connectivity to a wired LAN. Computing devices such as laptops, desktop computers, personal digital assistants, transactional terminals and similar devices gain access to the WLAN via a network interface, typically a network interface card (NIC). Access points usually provide security features and recognition between the wireless infrastructure and computing devices, and recognize authorized users by association, authorization and authentication. The access points often work in cooperation with a server application on the wired LAN to manage the network login process using a login/password mechanism. Commonly used WLAN technologies include IEEE 802.11b (Wi-Fi), IEEE 802.11a (Wi-Fi5), and IEEE 802.11 g. Other WLAN technologies known to those skilled in the art can also be used.

WLANs provide many advantages to network users and administrators. Users of wireless devices may move about within the effective radio range of the associated access point without loss of service. If the WLAN supports seamless roaming, the users may move from one access point radio area to an adjacent access point radio area without loss of service. For example, a laptop user may be able to move from an office to a conference room without loss of service and without reconfiguring the network. Depending on the WLAN design, users may also be able to move from inside to outside the building without loss of service. This may be by design or by an unwanted radio feature of the access points.

WLANs provide many conveniences for network users, but they also present some security risks and issues. For example, unauthorized or "rogue" access points may be installed by either a friendly or a malicious person. The installation of such device is a security risk because it is unknown to and unmanaged by the network's Information Technology (IT) staff. For example, the risks include unauthorized persons having access to the wired LAN with little or no wireless security, even if the organization normally uses WLANs associated with their wired LANs. This may result in exposure, modification, or destruction of organizational data, including private, proprietary, and personal information. Exposing this data can be the friendly or malicious intent of the person introducing the rogue access points, but may also expose the data to some other, unintended person. An example of "friendly" intent is an employee who desires the conveniences of a WLAN but is frustrated with the company's slowness in adopting WLAN technology and therefore installs his own inexpensive access point.

Another problem confronting information technology professionals operating LAN systems is the appearance of an unauthorized or "impersonating" access point, whose purpose is to impersonate the managed WLAN infrastructure to capture security information from unsuspecting, authorized users. This impersonating AP may reside, for example, in an organization's building, attached to the wired LAN, or outside the building. An unsuspecting user's wireless device may find and attempt to associate with the unauthorized access point, which logs into the organization's wireless LAN, thereby revealing security codes, security procedures, and similar information to the owner of the unauthorized access point. The owner can use this information, for example, to gain unauthorized access to the managed wireless LAN ("hacking") and thereby to the wired LAN, resulting in the exposure, modification, or destruction of organizational data, including private, proprietary, and personal information.

Another problem confronting the IT professional is the unauthorized use of wireless LAN clients to defeat the security measures of a wired network ("hacking" or "war driving"). Such use of wireless clients is becoming more common and has been included as standard software in some personal computers, including laptops and other portable computers. Yet another problem is that many wireless LAN devices are configured to operate in a peer-to-peer mode and create an unauthorized point-to-point wireless connection between two devices, for example, between two computers or between a networked computer and a wireless personal digital assistant (PDA).

These examples show the type of risks confronted by IT professionals and those working in the wireless LAN and network security area. These unauthorized access points and wireless devices present security risk for the administrators and owners of associated wired LANs, and in some cases, even non-networked computers unauthorized access points or wireless devices are part of wireless peer-to-peer networks.

One prior art proposal currently used to limit these security risks is manual tracking. In this method, network administrators survey the known, authorized wireless devices in the network and make periodic, manual searches for unauthorized devices using portable wireless clients or access points. This method is ineffective, however, for large organizations because it is limited by the capabilities of the wireless clients or access points used in the search, including range, frequency coverage, and reporting capabilities.

Another currently used proposal used to limit network security risks is the use of access points or other monitoring devices as permanent monitoring stations positioned throughout the coverage area, or the use of such devices in conjunction with a wireless LAN management system. These devices have many limitations, including a limited ability to detect equipment from other vendors, a limited detection range, a limited ability to detect unauthorized devices that are fire-walled or have their "beacons" turned off, and a requirement to support additional management systems for the sole purpose of monitoring the wireless LAN.

Similar proposals are disclosed in published PCT patent applications WO 03/085544; WO 03/075021; WO 03/079708; WO 03/084255; WO 03/088687; WO 03/088547; and WO 03/100559.

In WO 03/085544, an unauthorized station is detected by transmitting over the WLAN from a station a network probe request frame. The probe request frame is received at a detector and analyzed to determine if the station that transmitted the probe request frame is an unauthorized station. This frame is received at an access point and a probe response frame is sent from this access point. The probe request frame typically has a service set identification address ("SSID"), and is analyzed by examining the probe request frame to determine if the length of the SSID is zero. The probe request frame is also analyzed to determine if the probe request frame only has an SSID information element field. A determination can be made if the station that transmitted the probe request frame fails to proceed with authentication or authorization in response to the probe response frame.

A wireless local area network (WLAN) is monitored using the system disclosed in WO 03/088547, by receiving transmissions exchanged between one or more stations and an access point using a detector. A database is compiled based on the received transmissions, which are analyzed to determine the state of the station. The compiled database and the determined state of the station are used to diagnose connectivity problems of the station. A Medium Access Control (MAC) adjusts so the station can be obtained and the transmission received using the detector. The transmission includes a source access and a destination address. These are determined if they are MAC addresses of the station. Other details of monitoring and measuring transmissions from a station to an access point for detecting a hidden node are set forth in the other published PCT patent applications.

Even with the many existing proposals, there is still a need for improved systems, devices and methods to detect the presence of unauthorized access points and wireless devices in the LAN systems as described above.

SUMMARY OF THE INVENTION

It is therefore an object of the present invention to provide a WLAN monitoring system and method that overcomes the disadvantages of the various prior art proposals as described above.

These and other needs are met by the present invention which provides a monitoring system for Wireless LANs and a method for monitoring wireless LANs that incorporate a wireless LAN monitoring device, which includes a wireless network interface, a processor, a low-noise preamplifier, an antenna, and an Ethernet or other communications port, supporting the formation of (1) a wireless network monitoring system, and (2) wireless network reporting system.

In accordance with the present invention, the antenna is operative to capture a wireless LAN radio frequency signal. The low-noise amplifier preamplifies this signal, adding little noise. The wireless network interface (such as a wireless network interface card or "NIC") is operative to receive the wireless LAN radio frequency signal and demodulate it to an Ethernet or other packet communications signal. The processor analyzes the packets and monitors the WLAN for unauthorized access points and wireless devices. The processor may use a communications port, such as an Ethernet port, which is attached to a wired LAN or computer, to communicate with an application on a server or computer and report data regarding the results of the wireless monitoring.

The wireless LAN monitoring device can include a sectorized antenna, an integrated preamplifier as part of the network interface, and a sectorized antenna selection switch. This structure can be used indoor or outdoors. The sectorized antenna improves the receiver range and geolocation capability of the system. Similarly, the present invention can include other high-gain antennas, including electrically or mechanically steered antennas and phased-array antennas. A second antenna and a supporting antenna switching mechanism can be provided, which can use diverse antenna geometries for detection range improvement and geolocation of unauthorized devices and LAN assets.

An additional Ethernet or other communications port can be provided to enable the processor to receive Ethernet or other packet communications and monitor, filter and report activity received via the port and re-transmit the received packets back to the wired LAN via the other or same port.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
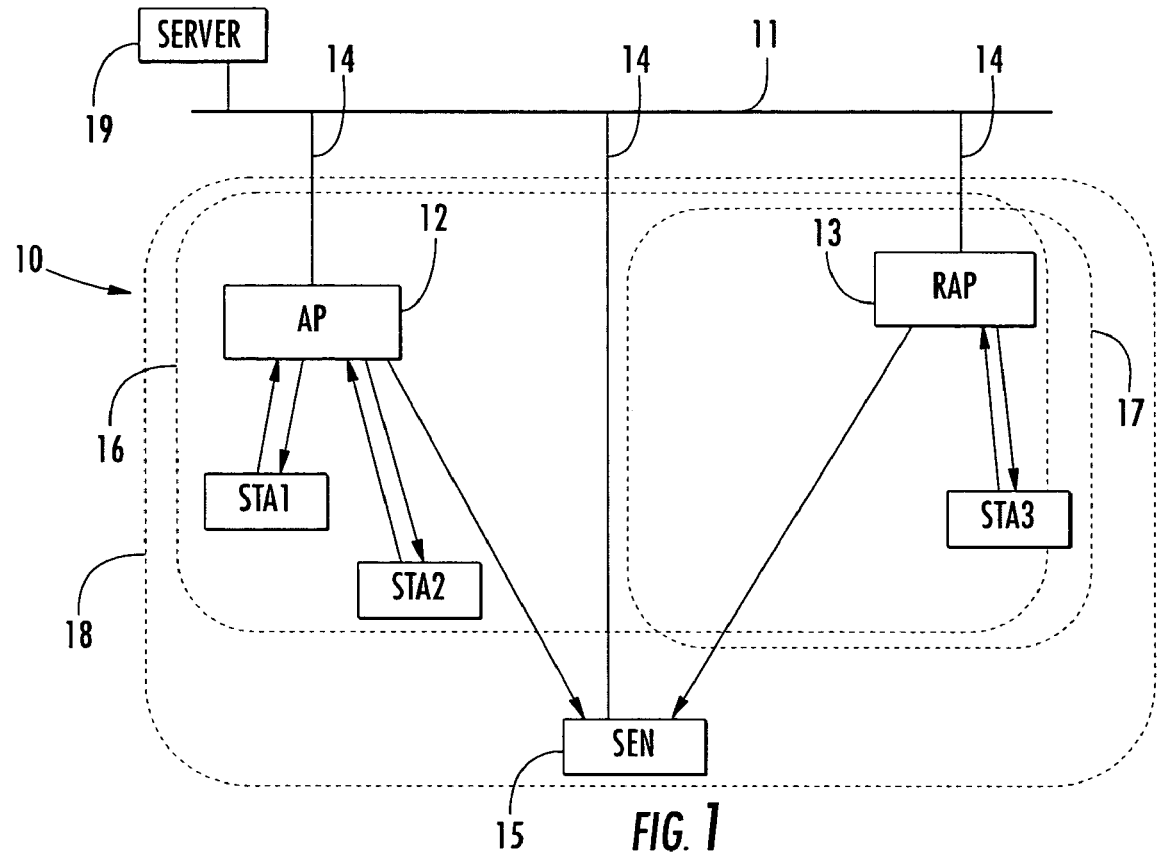
FIG. 1 is a block diagram illustrating a system that monitors a wireless LAN, and showing authorized and unauthorized access points monitored by the wireless LAN monitoring device of the present invention.

FIG. 1 illustrates a wireless local area network (WLAN), generally indicated at 10. Examples of such networks include IEEE 802.11b, 802.11a, and 802.11 g networks that provide WLAN networking. In this illustrated example, one authorized access point 12 provides a defined wireless coverage area 16 and provides wireless user client stations STA1 and STA2 access to a wired local area network (LAN) 11 through respective wired connection 14 that connects to access point 12. A "rogue" or unauthorized access point 13 has a wireless coverage area indicated at 17 and is partially within the coverage area 16. User client station STA3 is associated with the unauthorized access point 13, which in the illustrated example, is connected to wired LAN 11 using the wired connection 14. Wireless user client stations STA 1-2 typically have two-way communications with the access point 12, as indicated by arrowed lines. Similarly, the wireless client station STA3 has two-way communications with the unauthorized access point 13, as indicated by the arrowed lines.

The wireless LAN monitoring station (device) 15 of the present invention, also referred to as a "sentinel" or "sentinel station," has a wireless receive coverage area 18 that covers all of coverage areas 16 and 17 and beyond in this example. The monitoring station 15 can receive the signals from access point 12 and unauthorized access point 13, as indicated by the arrowed lines therebetween. The monitoring station 15 may also receive transmissions from user client stations STA 1-3, which typically have omni-directional antennas. The monitoring station 15 is attached to the wired LAN 11 using a wired connection 14. A server 19 is preferably connected to the wired LAN 11 for providing data received from any monitoring station.

The monitoring station 15 monitors its wireless coverage area 17 and detects the presence of an access point 12 or unauthorized access point 13 and client user stations STA 1-3 by receiving the wireless LAN radio frequency signals therefrom and reporting the presence of these components to an associated management application in the server 19, using the wired connection 14.

In one aspect of the present invention, the monitoring station 15 has receive capability, and does not require radio transmission capability to fulfill its monitoring capability. This lack of transmission capability is advantageous for a wireless monitoring station since the monitoring device is not subject to attack from any devices it is monitoring. These attacks could include but are not limited to radio jamming. In addition, the presence of a monitoring device could be revealed by any transmissions from the monitoring station, indicating useful information for a malicious attacker. It should be understood, however, that the monitoring station (device) of the present invention may be allowed some transmission capability, if desired, for non-critical functions. If the transmissions are interfered with in some way, however, the monitoring functions will remain fully functional. Out-of-band wireless communications could be used for these non-critical functions.

The monitoring station 15 determines the presence of all access points 12 and 13, user stations STA 1-3, and other wireless LAN devices, for example, wireless personal digital assistants (PDAs) as one non-limiting example. The monitoring station 15 may determine if access points 12 and 13, user stations STA 1-3, or other wireless LAN devices (not shown) are authorized on the wireless network by observing the Media Access Control (MAC) addresses or network addresses (such as IP addresses) in the transmissions therefrom and determine if the MAC or network addresses are in a database on the server 19. Alternatively, the monitoring station 15 may report the located wireless devices to server 19. At this time, a manual or automatic process could be used to determine which wireless devices are not authorized. Similarly, peer-to-peer communications can be detected by observing transmitted packets from monitored devices. The monitoring station 15 could query a database on the server 19 and determine if peer-to-peer communications are authorized. Any databases on the server 19 would typically be created and maintained by network staff, and be populated manually or initially by a discovery scan conducted by the monitoring station 15. The database is typically scrutinized by network staff for unauthorized wireless devices. For reference, further detailed descriptions of wireless local area networks can be found in the relevant open specifications for IEEE 802.11 networks.

Figure 2:
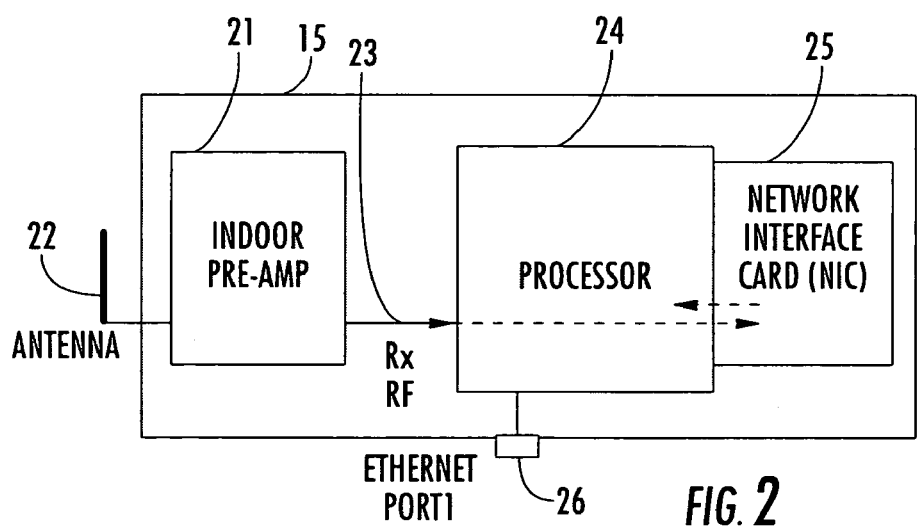
FIG. 2 is a block diagram of one example of the wireless LAN monitoring device of the present invention.

FIG. 2 illustrates in greater detail the wireless LAN monitoring station (device) 15 of FIG. 1. The monitoring station 15 includes an antenna 22 for receiving wireless LAN radio frequency signals from monitored devices, a low-noise preamplifier 21 that amplifies the received wireless LAN radio frequency signals received from the antenna 22 while injecting little noise, a network interface formed as a preferred network inteface card (NIC) 25, which in one aspect of the present invention further amplifies the received wireless LAN radio frequency signals and demodulates the signals, producing in one aspect of the invention the Ethernet or other packet communications signals carried by the wireless LAN radio frequency signals. A processor 24 uses the packets from the demodulated signal to determine which wireless devices are within the receiving range of the monitoring station 15. The processor 24 reports the presence of wireless devices to a server application within the server 19 (FIG. 1) via a wired LAN connection attached to a communications port, which in one non-limiting example, is an Ethernet port 26. The low-noise amplifier 21 is typically an "indoor" amplifier, but this is non-limiting and could be designed as "outdoor."

The low-noise preamplifier 21 is advantageous even though the network interface card 25 typically also includes an integrated preamplifier circuit. This separate low-noise preamplifier 21 provides a considerably improved noise figure compared to the noise level associated with typical network interface cards 25. Thus, the receive range of the monitoring station 15 is extended. Prior art low-cost access points have been proposed for monitoring, but these prior art access points have a much lower receive range compared to the monitoring station 15 of the present invention, which uses the relatively expensive, low-noise preamplifier 21, and preferably uses a high-quality, higher-gain antenna.

It is not obvious to use a low-noise preamplifier in the present invention because those skilled in the art believed that typical access points would not benefit from an extended receive range because there was not an equivalent transmit range improvement, and therefore, two-way communication with a user client station would not be possible if only the receive range of the access point was extended. While technically the transmission range could also be increased to match the receive range, power restrictions in the wireless LAN standard may limit the transmission range significantly. In addition, the network interface 25 will typically have an integrated preamplifier, and thus, it is not obvious to add another preamplifier. Adding an additional, higher-cost, lower-noise preamplifier, however, ahead of the existing preamplifier, may nullify some of the benefits of the existing preamplifier, but the overall system performance is improved by lowering the noise figure. Using a network interface card having an integrated preamplifier is inexpensive compared to a discrete design, even if the integrated preamplifier in the network interface card is not required.

As will be understood to one skilled in the art, the processor 24 is usually a computer circuit with software that manages the operation of the monitoring station 15, although dedicated hardware could also be used. The network interface card 25 is typically a plug-in card having a standard bus interface. Other implementations, however, could be used in the present invention, including an integrated network interface on the processor 24, or a proprietary design performing the same function typical of network interface cards such as 802.11b ("Wi-Fi"), 802.11a, and 802.11 g cards. Standard bus network interface cards 25 can be used because of their low-cost and ready adaptation to the monitoring station 15, and to the present and future wireless LAN standards by substituting a bus-compatible network interface card 25 designed for the desired wireless network standard.

Any antenna 22, low-noise amplifier 21 and network interface card 25 are operative for multiple wireless network standards and frequency plans, including cards and equivalent integrated parts that service two or more of the current or future 802.11 standards and frequency plans, including 802.11b, 802.11a, and 802.11 g, and any variations in the national frequency plans throughout the world. The present invention can have similar support for other wireless LAN architectures, including the IEEE 802.16 standard. Different antennas 22, including omni-directional and various high-gain antennas can be attached directly to the monitoring station 15 or attached by an appropriate cable. Any high-gain antenna could include sectorized antennas, electrically steerable beam antennas, mechanically steerable beam antennas, and phased array antennas.

The monitoring station 15 can be powered by direct or alternating current power supplies, including a "Power over Ethernet" circuit in which direct current power is received over an Ethernet cable (not shown) attached via the Ethernet port 26.

Figure 3:
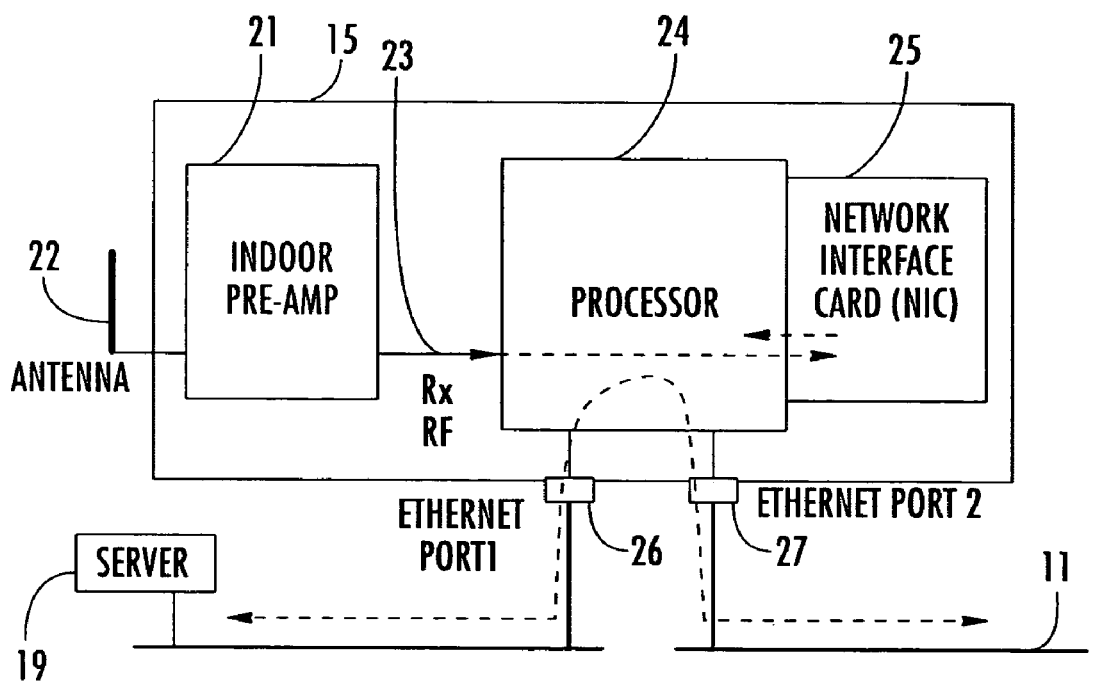
FIG. 3 is a block diagram illustrating another embodiment of the wireless LAN monitoring device of the present invention, which includes two Ethernet ports for monitoring a wired LAN.

FIG. 3 illustrates a monitoring station 15 similar to the monitoring station shown in FIG. 2, except an additional Ethernet port 27 is added. In FIG. 3, this port 27 allows the monitoring station 15 to monitor packets on the wired LAN 11 by receiving Ethernet or other packets. The processor 24 analyzes and filters the packets, or return the packets to the wired LAN 11 using the Ethernet port 27. Similarly, packets may enter the processor 24 via port 27 and re-enter the wired LAN 11 via the port 16.

The processor 24 may report filtering and packet statistics to an application on the server 19 attached to the wired LAN 11. This information can be based on Media Access Control (MAC) source addresses, network source addresses, MAC destination addresses, network destination addresses, protocol ID, application, and similar items or data. The monitoring station 15 may perform this filtering and reporting functionality alone or in combination with the wireless LAN monitoring functionality as described for FIG. 1.

Figure 4:
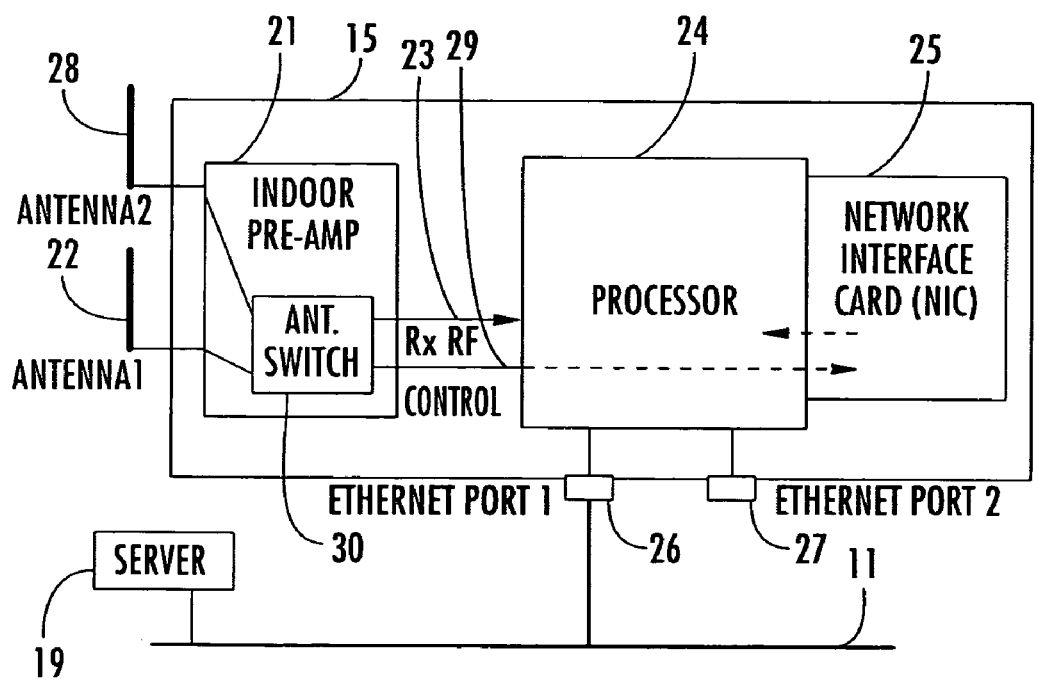
FIG. 4 is a block diagram illustrating yet another embodiment of a wireless LAN monitoring device of the present invention, and showing a second antenna and an antenna switch.

FIG. 4 illustrates another embodiment of the monitoring station 15 similar to that shown in FIG. 2, except an additional antenna 28 has been added and an antenna-switching mechanism 30 added to the indoor preamplifier 21. The antenna-switching mechanism 30 is controllable from the processor 24. The embodiment of the present invention shown in FIG. 4 performs the functionality similar to that of FIG. 1, except that the additional antenna 28 enables the monitoring station 15 to monitor a wired LAN via the antenna 22 and antenna 28. As will be apparent to one skilled in the art, antennas 22 and 28 may provide monitoring diversity in terms of the location of antennas 22 and 28 and coverage area geometry of antennas 22 and 28. For example, antenna 22 may have a high-gain geometry for long range, while antenna 28 may have an omni-directional geometry to fill in a wide coverage area horizontally and vertically. The processor 24 can alternately switch between antennas 22 and 28 by a control signal 29 operative to cause antenna switch 30 to select antenna 22 or 28 as the receiving antenna. A preamplifier with an antenna switch is described in more detail with reference to the description of FIG. 5.

Another application of using two antennas as shown in FIG. 4 is geolocation. If an unauthorized access point is discovered, it would be helpful to determine the general location of this unauthorized device so that it can be removed more easily. A rough estimation of the location of this rogue or unauthorized device can be determined using the location of the monitoring station 15 (which can be augmented by a GPS device or relative to a reference point), the orientation of antennas 22 and 28 with respect to a reference point in the wireless LAN coverage area (or true north), the receive pattern of antennas 22 and 28, the gain of antennas 22 and 28, and the measured signal strength of the unauthorized device transmission for each antenna 22 and 28. By observing the difference between the gain of antennas 22 and 28 and the respective measured signal strength of the unauthorized device, a relative "distance from" estimation can be made for the two antennas 22 and 28.

Depending on the known geometry of the selected antennas, a general corridor or common azimuth for the location of the unauthorized device can be determined. This process can be improved by using experimental data in which a portable reference device is moved around the area covered by the wireless LAN and plotting the signal strengths measured by the two antennas 22 and 28 for various points within the area. A pattern-matching scheme can be used to compare the measured signal strengths of the unauthorized device and the experimental reference device.

This process of geolocation can be assisted by applications in the server 19. The monitoring station 15 may report location information to the server 19 on the wired LAN 11 via the Ethernet port 26. The greater processing power of the server 19 may be used to estimate geolocations. This process can be further improved by constructing a database of manufacturing data for known access points and other wireless devices, with the database containing the transmission power of the access points and other wireless devices. This database can reside on the server 19 of the wired LAN 11, accessible to the monitoring station 15 using the Ethernet or other communications port 26. The manufacturer data record can be selected from the database by looking at the MAC address of the suspected unauthorized device. A portion of the MAC address identifies the manufacturer and another portion of the MAC address identifies the model or model family. By comparing the transmitting power of the suspected, unauthorized device with the power measured by antennas 22 and 28, a rough distance from the antennas can be determined.

Another application for geolocation applicable to the monitoring station 15 is asset tracking. For example, the monitoring station 15 may detect assets that have been combined with a wireless device for the purpose of tracking. The monitoring station 15 will normally detect such devices and report the geolocation to an application in the server 19, which records the asset locations and notes any movement of the asset. If the asset's wireless device includes a GPS (global positioning system) device and can report its GPS coordinates over the wireless network, the monitoring station can report the location of the assets very precisely.

It should be understood that multiple monitoring stations can also be used for geolocation. For example, if three monitoring stations are used and each station reports the general direction of a suspected unauthorized wireless device, then triangulation can be used to determine accurately the location of a suspected, unauthorized wireless device. The triangulation calculations can be supported by and accomplished within the server 19. Other geolocation methods can be used as known to those skilled in the art.

Figure 5:
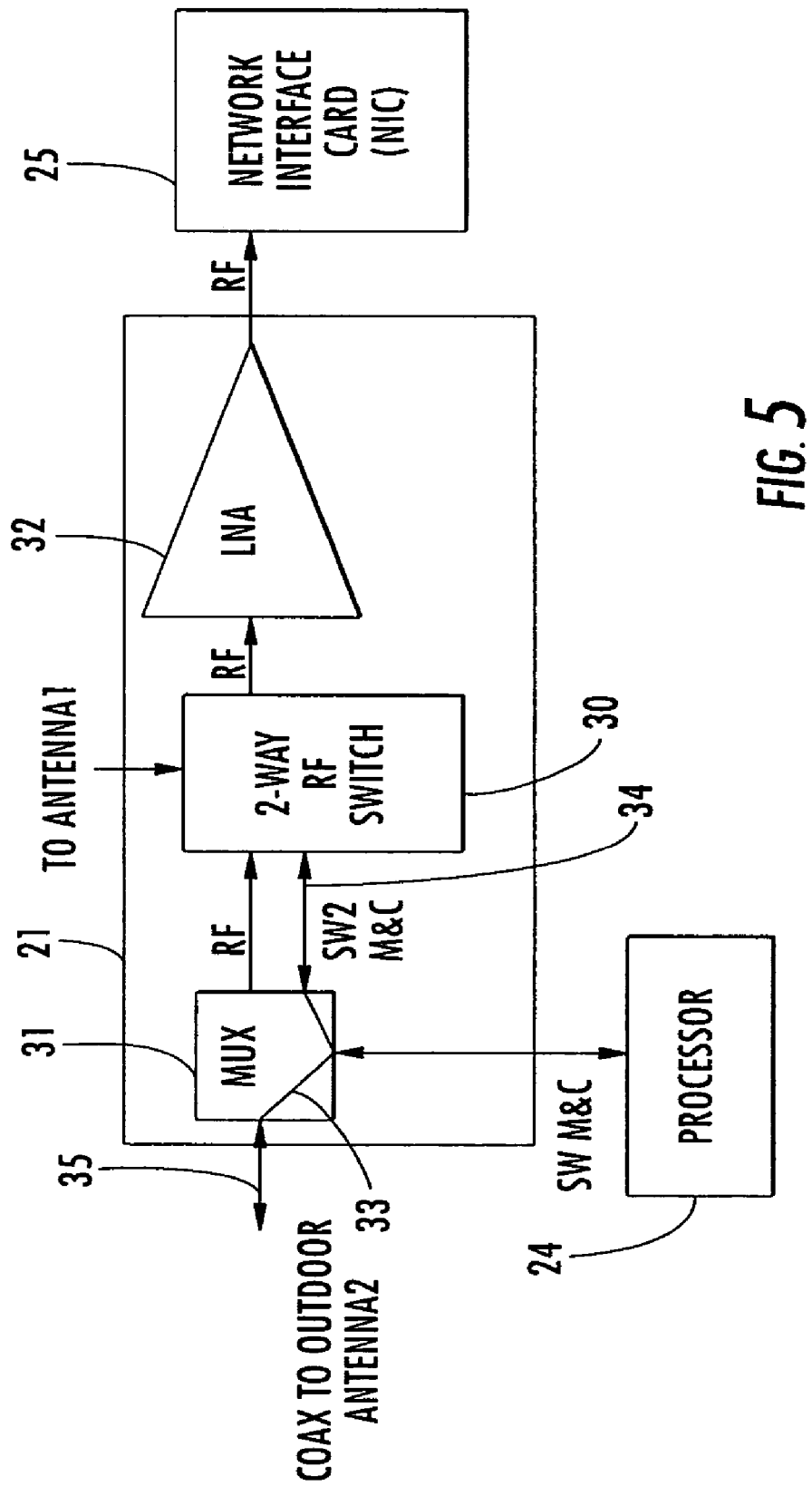
FIG. 5 is a block diagram illustrating an indoor low noise amplifier used with two antennas in a wireless LAN monitoring device of the present invention.

FIG. 5 illustrates in greater detail the high-level components of the preamplifier 21, which includes an antenna switch 30. In the example of FIG. 5, a first antenna (1) is a passive antenna and a second antenna (2) is an active antenna, requiring a control signal. In FIG. 5, the preamplifier 21 includes a multiplexer circuit 31 (which could include a demultiplexing function), a two-way RF switch 30, and a low-noise amplifier (LNA) 32.

The multiplexer 31 receives an antenna control signal 33 or antenna switch control signal 34 from the processor 24, and multiplexes the antenna control signal 33 onto the radio frequency cable (coax) used to carry the receive radio frequency (RF) signals from the second antenna (2) (not shown). Although not illustrated, the multiplexer 31 may also multiplex direct current power onto the coax. The multiplexer 31 passes the antenna control signal 33 to the second antenna (2) using the coax and passes the receive RF signal from the second antenna (2) to the two-way RF switch 30, which is controllable from the processor 24 using a control signal 34. The first antenna (1) or second antenna (2) is selected and switched to the LNA 32, which preamplifies the RF signal received from the selected first and second antenna (1-2) and sends the preamplified RF signal to the network interface card 25.

Various techniques for multiplexing a control signal 33 onto a radio frequency cable can be used. For example, a low-speed FSK modem could be placed on each end of the cable to provide a telemetry signal. An RF cable that includes a separate power or control cable could be used. In the present invention, only a very low-rate control signal 33 is required. As shown in greater detail in FIGS. 6A and 6B. This signal controls a high-gain antenna, such as sectorized antennas, electrically or mechanically steerable beam antennas, or phased-array antennas, several times per second, and receives feedback that the switching occurred. Thus, the telemetry requirements are minimal and many implementations can be used in accordance with the present invention. The antenna switch 21 could also perform preamplification and antenna switching for the antenna switch 21 shown in FIG. 4. The preamplification could provide extended receiver range for the monitoring station 15 of FIG. 4.

Returning now to FIG. 5, the second antenna (2) in this non-limiting example could be an active antenna. A passive antenna could be used as well, but in this aspect of the invention, it would not require a control signal 33 multiplexed onto the coax, according to the design of this second antenna (2). The purpose of the control signal to the second antenna (2) will now be described with reference to FIGS. 6A and 6B.

Figure 6A:
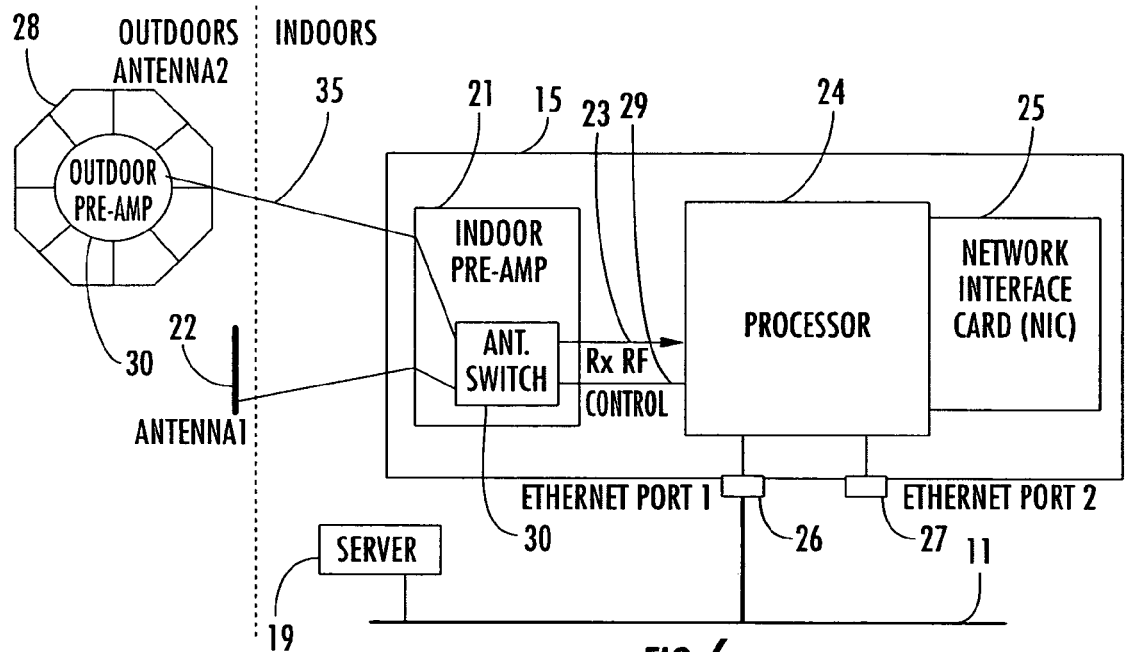
FIG. 6A is a block diagram illustrating a wireless LAN monitoring device of the present invention and showing a sectorized antenna and outdoor preamplifier.

FIG. 6A illustrates the monitoring station 15, shown in FIG. 4, in which the antenna 28 is an active, multi-sector antenna having its own preamplifier 31. In this non-limiting example, the multi-sector antenna 28 has eight sectors, each providing 60-degree coverage. The sectors overlap to minimize the chance of holes in the radio coverage area. In this example, the multi-sector antenna 28 has an outdoor design that allows the antenna to be mounted on the roof of a building, thus extending the overall range of the system, as compared to mounting the antenna 28 indoors. The gain of the 60-degree sectors is high compared to an omni-directional antenna. The inclusion of an outdoor preamplifier 30 improves the system receiver performance by amplifying the received radio signal "close" to the antenna and ahead of the coax cable loss while introducing little noise.

A control signal from the processor 24 enables the selection of a single sector to be received for a period of time. The processor 24 can also cycle through the sectors, thereby monitoring the radio coverage area of a sector one at a time. This process is illustrated in FIG. 6B and explained in greater detail below.

Other arrangements of sectors will be apparent to one skilled in the art, for example, four-sector or six-sector antennas, designed for indoor or outdoor use. While the sectorized antenna adds expense, its use of significantly improves the performance of the monitoring station 15 and may reduce the number of monitoring stations required for a given area.

Other types of high-gain antennas can be used, including electrically or mechanically steered antennas and phased-array antennas as understood by those skilled in the art. Steerable-beam antennas typically would require a steering control signal rather than a sector-selection control signal, whether electrically or mechanically steered. Phased-array antennas will similarly require a control mechanism for selecting the received phase angle of the antenna.

Figure 6B:
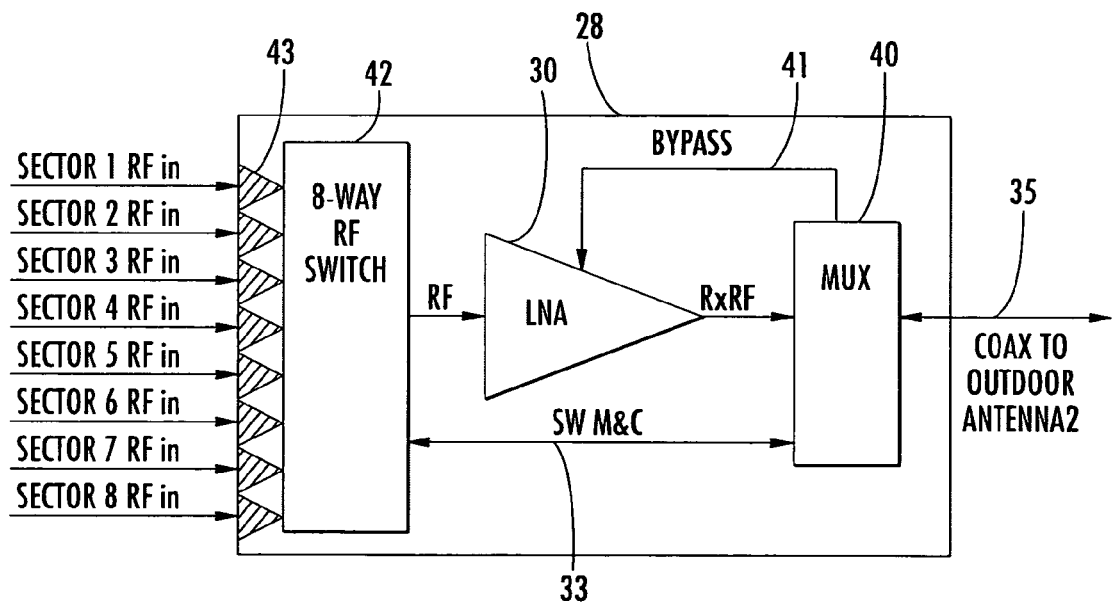
FIG. 6B is a block diagram showing greater details of the sectorized antenna of FIG. 6A.

FIG. 6B illustrates in greater detail the outdoor antenna 28 shown in FIG. 6A. This antenna 28 includes eight sector antennas 43, each receiving a respective wireless LAN RF signal. The antenna 28 also includes an eight-way RF switch 42, a low-noise amplifier (LNA) 30, and a multiplexer/demultiplexer 40, which includes multiplexing and demultiplexing functions. The MUX circuit 40 demultiplexes telemetry signals from coax 35 to produce a switch monitor and control signal (SW M&C) 33, or a bypass signal 41. This circuit 40 is operative, upon receipt of the switch monitor and control signal 33, to select one of the eight sector antennas by controlling eight-F switch 42, thereby passing the respective RF signal to the low-noise amplifier 30 and return a positive or negative response to the switch monitor and control signal 33, depending on the outcome of the switching attempt. The MUX circuit 40 and its companion in the indoor unit of the station 15 (FIG. 4) enables the transfer of the radio signal, telemetry or control signal and power over a single cable 35, thus significantly reducing the equipment and installation costs of the system. Low-noise amplifier 30 amplifies the respective RF signal and passes the amplified signal, which combines the amplified signal with telemetry signals, such as a completion response to a switch monitor and control signal 33 or a bypass signal 41 destined for the monitoring station (not shown).

If the MUX circuit 40 receives a bypass signal 41 from the monitoring station, the MUX circuit 40 is operative to set the low-noise amplifier 30 into a non-amplifying (pass-through) mode and return a positive or negative response to the bypass signal 41 depending on the outcome of the mode set attempt. This mode is useful for the "near/far" problem where a nearby strong signal requires no amplification.

Thus, the monitoring station can first scan all sectors with the low-noise amplifier 30 bypassed and then scan all sectors with the low-noise amplifier 30 enabled. This novel arrangement enables the monitoring station to monitor the wireless LAN area with high gain because of the eight antenna sectors, with a good receiver noise figure because of the low-noise amplifier 30, and with good immunity to the near/far problem resulting from the bypass mode of low-noise amplifier 30. With these characteristics, and the low-noise indoor amplification of the monitoring station, a radio area of up to one mile or more can be monitored, compared to prior art systems of 300 feet, which is typical of monitoring stations based on prior art, off-the-shelf access points. In addition, access points typically have many limitations, such as partial coverage of the allowed frequency bands, lack of the receive only ("promiscuous") mode, a lack of high-gain antennas to match the applications, a lack of outdoor packaging to improve the coverage area, a lack of supporting server applications for monitoring, and the use of low-cost components, resulting in poor receiver noise figures and poor gain.

One preferred embodiment of the present invention includes an outdoor antenna as described with reference to FIG. 6A and FIG. 6B. Indoor antennas can be used also, and include cost-reducing trade-offs, for example, using a wired control signal for the sector selection, beam-steering or phase-angle selection, instead of a MUX circuit.

The monitoring stations 15 can be used for geolocating suspected unauthorized devices. The sectorized, steerable, or phased-array antennae provide improved geolocation capabilities when high-gain antennas are used, for example, eight antenna. This antenna directivity may be used to enhance the accuracy of location estimations. The signal strength of the suspected unauthorized device, as measured by each of the eight sectors in this present example (or steerable beam or phased array antenna in other non-limiting examples), may be reported to a server application to calculate the direction of the suspected unauthorized device with respect to the known, fixed location of the monitoring station. A second measurement from the monitoring station's other antenna may also be used in the calculations, which will depend on the geometry of the selected antennas.

Another application for geolocation applicable to the monitoring station 15 with sectorized, steerable or phased-array antenna 28 is asset tracking. The monitoring station 15 may detect assets that have been combined with a wireless device for the purpose of tracking. The monitoring station 15 will normally detect such devices and report the geolocation to an application in the server 19, which records the asset locations and notes any movement of the asset. If the asset's wireless device includes a GPS (global positioning system) device and can report its GPS coordinates over the wireless network, then the monitoring station can report the location of the assets very precisely.

In addition, geolocation involving the use of multiple, coordinated monitoring stations, as described in FIG. 4, can be improved by the increased accuracy of sectorized antenna 28.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A wireless local area network (LAN) monitoring system comprising:
   a wired LAN;
   a wireless LAN comprising at least one access point connected to said wired LAN for allowing wireless devices to communicate to the wired LAN; and
   a wireless LAN monitoring device connected to said wired LAN for receiving wireless LAN radio frequency signals from access points or wireless devices and determining the existence of an unauthorized access point or wireless device within the vicinity of the wired LAN, and comprising;
   a low-noise preamplifier that receives wireless LAN radio frequency signals and preamplifies the signals,
   a network interface that receives the wireless LAN radio frequency signals from the low-noise preamplifier and demodulates the received wireless LAN radio frequency signals into packet communications signals, and
   a processor operatively connected to said network interface for monitoring and analyzing said packet communications signals for unauthorized access points and wireless devices.

2. A wireless local area network (LAN) monitoring system according to claim 1, wherein said wireless LAN monitoring device comprises a communications port operatively connected to said processor and said wired LAN for transmitting on the wired LAN data regarding the results of any monitoring and analysis of the packet signals onto the wired LAN.

3. A wireless local area network (LAN) monitoring system according to claim 2, wherein said communications port comprises an Ethernet port.

4. A wireless local area network (LAN) monitoring system according to claim 2, and further comprising a second communications port through which packet communications signals are received for processing by said processor.

5. A wireless local area network (LAN) monitoring system according to claim 4, wherein said second communications port comprises an Ethernet port.

6. A wireless local area network (LAN) monitoring system according to claim 1, wherein said wired LAN comprises a server that receives data regarding the results of any monitoring and analysis of the packet signals for further processing.

7. A wireless local area network (LAN) monitoring system according to claim 6, wherein said server comprises a database that stores media access control (MAC) or other network addresses of authorized access points and wireless devices which can be compared with any MAC or other network address of a monitored access point or wireless device.

8. A wireless local area network (LAN) monitoring system according to claim 1, and further comprising an antenna connected to said low-noise preamplifier.

9. A wireless local area network (LAN) monitoring system according to claim 8, wherein said antenna comprises a multi-sectored antenna, electrically or mechanically steerable beam antenna, or phased array antenna.

10. A wireless local area network (LAN) monitoring system according to claim 8, wherein said wireless LAN monitoring device further comprises a second antenna for permitting antenna diversity or geolocation capabilities.

11. A wireless local area network (LAN) monitoring system according to claim 10, wherein said second antenna comprises an omni-directional antenna.

12. A wireless local area network (LAN) monitoring system according to claim 1, wherein said network interface comprises an integrated preamplifier operatively connected to said preamplifier.

13. A wireless local area network (LAN) monitoring system according to claim 1, wherein said network interface comprises an 802.11 network interface.

14. A wireless local area network (LAN) monitoring system comprising:
- a wired LAN;
- a wireless LAN comprising at least one access point connected to said wired LAN for allowing wireless devices to communicate to the wired LAN; and
- a wireless LAN monitoring device connected to said wired LAN for receiving wireless LAN radio frequency signals from access points or wireless devices and determining the existence of an unauthorized access point or wireless device within the vicinity of the wired LAN, and comprising;
  - a multi-sector antenna or phased array antenna that receives wireless LAN radio frequency signals,
  - a network interface that receives the wireless LAN radio frequency signals from the antenna and demodulates the received radio frequency signals into packet communications signals; and
  - a processor operatively connected to said network interface for monitoring and analyzing said packet communications signals for unauthorized access points and wireless devices.

15. A wireless local area network (LAN) monitoring system according to claim 14, and further comprising a preamplifier operatively connected to said antenna and network interface for preamplifying said wireless LAN radio frequency signals before demodulation.

16. A wireless local area network (LAN) monitoring system according to claim 15, wherein said wireless LAN monitoring device further comprises a second antenna for permitting antenna diversity or geolocation capabilities.

17. A wireless local area network (LAN) monitoring system according to claim 16, wherein said preamplifier comprises a two-way RF switch and multiplexer circuit operatively connected to said first and second antennae for carrying antenna control signals to at least said multi-sector or phased array or second antenna.

18. A wireless local area network (LAN) monitoring system according to claim 16, wherein said second antenna comprises an omni-directional antenna.

19. A wireless local area network (LAN) monitoring system according to claim 15, wherein said network interface comprises an integrated preamplifier operatively connected to said preamplifier.

20. A wireless local area network (LAN) monitoring system according to claim 14, wherein said network interface comprises an 802.11 network interface.

21. A wireless local area network (LAN) monitoring system according to claim 14, wherein said wireless LAN monitoring device comprises a communications port operatively connected to said processor and said wired LAN for transmitting on the wired LAN data regarding the results of any monitoring and analysis of the packet signals onto the wired LAN.

22. A wireless local area network (LAN) monitoring system according to claim 21, wherein said communications port comprises an Ethernet port.

23. A wireless local area network (LAN) monitoring system according to claim 21, and further comprising a second communications port through which packet communications signals are received for processing by said processor.

24. A wireless local area network (LAN) monitoring system according to claim 23, wherein said second communications port comprises an Ethernet port.

25. A wireless local area network (LAN) monitoring system according to claim 23, wherein said wired LAN comprises a server that receives data regarding the results of any monitoring and analysis of the packet signals for further processing.

26. A wireless local area network (LAN) monitoring system according to claim 25, wherein said server comprises a database that stores media access control (MAC) or other network addresses of authorized access points and wireless devices which can be compared with any MAC or other network address of a monitored access point or wireless device.

27. A wireless local area network (LAN) monitoring device for determining the existence of an unauthorized access point or wireless device comprising:
- a low-noise preamplifier that receives wireless LAN radio frequency signals from access points or wireless devices and preamplifies the signals;
- a network interface that receives the wireless LAN radio frequency signals from the low-noise preamplifier and demodulates the received wireless LAN radio frequency signals into packet communications signals; and
- a processor operatively connected to said network interface for monitoring and analyzing said packet communications signals for unauthorized access points and wireless devices.

28. A wireless local area network (LAN) monitoring device according to claim 27, and further comprising a communications port operatively connected to said processor through which data is transmitted onto a wired LAN connected thereto.

29. A wireless local area network (LAN) monitoring device according to claim 28, and further comprising a second communications port through which packet communications signals are received for processing by said processor.

30. A wireless local area network (LAN) monitoring device according to claim 29, wherein said second communications port comprises an Ethernet port.

31. A wireless local area network (LAN) monitoring device according to claim 27, wherein said communications port comprises an Ethernet port.

32. A wireless local area network (LAN) monitoring device according to claim 27, and further comprising an antenna connected to said low-noise preamplifier.

33. A wireless local area network (LAN) monitoring device according to claim 32, wherein said antenna comprises a multi-sectored antenna, electrically or mechanically steerable beam antenna, or phased array antenna.

34. A wireless local area network (LAN) monitoring device according to claim 32, and further comprising a second antenna for permitting antenna diversity or geolocation capabilities.

35. A wireless local area network (LAN) monitoring device according to claim 34, wherein said second antenna comprises an omni-directional antenna.

36. A wireless local area network (LAN) monitoring device according to claim 34, and further comprising a communications port operatively connected to said processor through which data is transmitted onto a wired LAN connected thereto.

37. A wireless local area network (LAN) monitoring device according to claim 36, wherein said communications port comprises an Ethernet port.

38. A wireless local area network (LAN) monitoring device according to claim 36, and further comprising a second communications port through which packet communications signals are received for processing by said processor.

39. A wireless local area network (LAN) monitoring device according to claim 38, wherein said second communications port comprises an Ethernet port.

40. A wireless local area network (LAN) monitoring device according to claim 27, wherein said network interface comprises an integrated preamplifier operatively connected to said preamplifier.

41. A wireless local area network (LAN) monitoring device according to claim 27, wherein said network interface comprises an 802.11 network interface.

42. A wireless local area network (LAN) monitoring device for determining the existence of an unauthorized access point or wireless device comprising:
   a multi-sector or phased array antenna that receives wireless LAN radio frequency signals from access points or wireless devices;
   a network interface that receives the wireless LAN radio frequency signals from the multi-sector or phased array antenna and demodulates the received radio frequency signals into packet communications signals; and
   a processor operatively connected to said network interface for monitoring and analyzing said packet communications signals for unauthorized access points and wireless devices.

43. A wireless local area network (LAN) monitoring device according to claim 42, and further comprising a preamplifier operatively connected to said antenna and network interface for preamplifying said wireless LAN radio frequency signals before demodulation.

44. A wireless local area network (LAN) monitoring device according to claim 42, and further comprising a second antenna for permitting antenna diversity or geolocation capabilities.

45. A wireless local area network (LAN) monitoring device according to claim 42, wherein said preamplifier comprises a two-way RF switch and multiplexer circuit operatively connected to said first and second antennae for carrying antenna control signals.

46. A wireless local area network (LAN) monitoring device according to claim 44, wherein said second antenna comprises an omni-directional antenna.

47. A wireless local area network (LAN) monitoring device according to claim 42, wherein said network interface comprises an integrated preamplifier operatively connected to said preamplifier.

48. A wireless local area network (LAN) monitoring device according to claim 42, wherein said network interface comprises an 802.11 network interface.

49. A method for monitoring a wireless local area network (LAN) for unauthorized access points or wireless devices, which comprises receiving wireless LAN radio frequency signals within a low-noise preamplifier from an access point or wireless device;
   demodulating the wireless LAN radio frequency signals into packet communications signals within a network interface; and
   monitoring and analyzing the packet communications signals within a processor for unauthorized access points and wireless devices.

50. A method according to claim 49, which further comprises interfacing the packet communications signal with a wired LAN.

51. A method according to claim 50, which further comprises interfacing the packet communications signal with a wired LAN through an Ethernet port.

52. A method according to claim 49, which further comprises receiving packet communications signals through a second communications port.

53. A method according to claim 49, which further comprises receiving data related to the monitoring and analyzing of the packet communications signals within a server or computer for further processing.

54. A method according to claim 53, which further comprises storing media access control (MAC) or other network addresses of authorized access points and wireless devices and comparing the MAC or other network address of the monitored access point or wireless device with the stored addresses for determining if a monitored access point or wireless device is authorized.

55. A method according to claim 49, which further comprises receiving wireless LAN radio frequency signals through a second antenna.

56. A method according to claim 55, which further comprises performing antenna diversity and geolocation.

* * * * *